(12) United States Patent
Tochigi

(10) Patent No.: US 12,420,818 B2
(45) Date of Patent: Sep. 23, 2025

(54) VEHICLE DRIVING ASSISTANCE APPARATUS

(71) Applicant: TOYOTA JIDOSHA KABUSHIKI KAISHA, Toyota (JP)

(72) Inventor: Kohei Tochigi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 128 days.

(21) Appl. No.: 18/425,573

(22) Filed: Jan. 29, 2024

(65) Prior Publication Data

US 2024/0317249 A1    Sep. 26, 2024

(30) Foreign Application Priority Data

Mar. 24, 2023    (JP) .................................. 2023-048416

(51) Int. Cl.
*B60W 50/00* (2006.01)
*B60W 30/18* (2012.01)
*B60W 50/10* (2012.01)

(52) U.S. Cl.
CPC ...... *B60W 50/10* (2013.01); *B60W 30/18009* (2013.01); *B60W 2540/10* (2013.01); *B60W 2540/12* (2013.01); *B60W 2720/106* (2013.01)

(58) Field of Classification Search
CPC ........... B60W 50/10; B60W 30/18009; B60W 2540/10; B60W 2540/12; B60W 2720/106; B60W 2520/105; B60W 30/16; B60W 30/162; B60W 30/18109; B60W 30/0953; B60W 30/09; B60W 40/10
See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 * | 2/2013 | Inoue ................. | B60W 10/184 |
| | | | 701/84 |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |

(Continued)

FOREIGN PATENT DOCUMENTS

JP    2022-028418 A    2/2022

*Primary Examiner* — Phutthiwat Wongwian
*Assistant Examiner* — Sherman D Manley
(74) *Attorney, Agent, or Firm* — Sughrue Mion, PLLC

(57) ABSTRACT

A vehicle driving assistance apparatus terminates decelerating an own vehicle with a second deceleration characteristic by a deceleration control and starts to decelerate the own vehicle with a first deceleration characteristic by the deceleration control when a predetermined time elapses since an accelerator operation is released while a deceleration target is detected, or when a deceleration intensity of the first deceleration characteristic is equal to or smaller than a predetermined intensity. The apparatus terminates decelerating the own vehicle with a third deceleration characteristic by the deceleration control and starts to decelerate the own vehicle with the first deceleration characteristic by the deceleration control when a predetermined time elapses since a brake operation is released while the deceleration target is detected, or when the deceleration intensity of the third deceleration characteristic is equal to or smaller than a predetermined intensity.

5 Claims, 6 Drawing Sheets

(56) References Cited

U.S. PATENT DOCUMENTS

| | | |
|---|---|---|
| 10,017,178 B2 | 7/2018 | Morimoto et al. |
| 10,118,617 B2 | 11/2018 | Urano et al. |
| 10,486,698 B2 | 11/2019 | Masui et al. |
| 12,246,719 B2* | 3/2025 | Nishimoto ...... B60W 30/18154 |
| 12,263,845 B2* | 4/2025 | Ito ..................... B60W 50/14 |
| 12,311,943 B2* | 5/2025 | Ito .................... B60W 40/1005 |
| 12,344,216 B2* | 7/2025 | Ito ................... B60W 30/18118 |
| 12,358,506 B2* | 7/2025 | Ikezawa ........... B60W 30/18154 |
| 2001/0004028 A1* | 6/2001 | Sato ................... B60K 31/0008 |
| | | 180/165 |
| 2019/0295419 A1 | 9/2019 | Tosa et al. |
| 2022/0032883 A1* | 2/2022 | Ito ............................ B60T 7/12 |
| 2023/0219571 A1* | 7/2023 | Ito ....................... B60W 30/095 |
| | | 701/70 |
| 2024/0067167 A1* | 2/2024 | Toyoda ................ B60W 50/10 |
| 2024/0075932 A1* | 3/2024 | Ikezawa .......... B60W 30/18159 |

* cited by examiner

VEHICLE DRIVING ASSISTANCE APPARATUS

CROSS-REFERENCE TO RELATED APPLICATIONS

This application claims priority to Japanese patent application No. JP 2023-48416 filed on Mar. 24, 2023, the content of which is hereby incorporated by reference in its entirety.

BACKGROUND

Field

The present invention relates to a vehicle driving assistance apparatus.

Description of the Related Art

There is known a vehicle driving assistance apparatus which is configured to decelerate an own vehicle, increasing a deceleration rate of the own vehicle when a deceleration target which leads to a necessity of decelerating the own vehicle, is detected, and an operation of an accelerator pedal is released, compared with when the deceleration target is detected, and an operation of a brake pedal is released (for example, see JP 2022-28418 A).

If the own vehicle continues to be decelerated, increasing the deceleration rate of the own vehicle after the operation of the accelerator pedal is released while the deceleration target is detected as in the above-described vehicle driving assistance apparatus, the deceleration rate of the own vehicle may become excessive. Conversely, if the own vehicle continues to be decelerated, decreasing the deceleration rate of the own vehicle after the operation of the brake pedal is released while the deceleration target is detected, the deceleration of the own vehicle may be insufficient.

SUMMARY

An object of the present invention is to provide a vehicle driving assistance apparatus which can appropriately assist the deceleration of the own vehicle, depending on states of the own vehicle.

According to the present invention, a vehicle driving assistance apparatus comprises an electronic control unit. The electronic control unit is configured to execute a deceleration control to decelerate an own vehicle with a first deceleration characteristic that a deceleration intensity of decelerating the own vehicle is a first intensity when a deceleration target which leads to a necessity of decelerating the own vehicle, is detected while an operation of an accelerator pedal or a brake pedal is released. In addition, the electronic control unit is configured to decelerate the own vehicle with a second deceleration characteristic that the deceleration intensity is a second intensity equal to or greater than the first intensity when the operation of the accelerator pedal is released while the deceleration target is detected. In addition, the electronic control unit is configured to decelerate the own vehicle with a third deceleration characteristic that the deceleration intensity is a third intensity equal to or smaller than the first intensity when the operation of the brake pedal is released while the deceleration target is detected. The electronic control unit is further configured to terminate decelerating the own vehicle with the second deceleration characteristic by the deceleration control and start to decelerate the own vehicle with the first deceleration characteristic by the deceleration control when a predetermined accelerator release elapsing time elapses since the operation of the accelerator pedal is released while the deceleration target is detected, or when the deceleration intensity of the first deceleration characteristic is equal to or smaller than a predetermined accelerator release deceleration intensity. In addition, the electronic control unit is further configured to terminate decelerating the own vehicle with the third deceleration characteristic by the deceleration control and start to decelerate the own vehicle with the first deceleration characteristic by the deceleration control when a predetermined brake release elapsing time elapses since the operation of the brake pedal is released while the deceleration target is detected, or when the deceleration intensity of the third deceleration characteristic is equal to or smaller than a predetermined brake release deceleration intensity.

With the vehicle driving assistance apparatus according to the present invention, the deceleration intensity of decelerating the own vehicle is decreased in a scene that the own vehicle starts to be decelerated with the relatively great deceleration intensity in response to the operation of the accelerator pedal being released while the deceleration target is detected and after a certain period of time elapses therefrom, a deceleration of the own vehicle may become excessive, or in a scene that the deceleration of the own vehicle may become excessive due to the deceleration rate becoming relatively small while the deceleration target is detected. Therefore, the deceleration of the own vehicle can be appropriately assisted. In addition, the intensity of the deceleration of the own vehicle is increased in a scene that the own vehicle starts to be decelerated with the relatively small deceleration intensity in response to the brake pedal being released while the deceleration target is detected and after a certain period of time elapses therefrom, the deceleration of the own vehicle may become insufficient, or in a scene that the deceleration of the own vehicle may become insufficient due to the deceleration rate becoming relatively great while the deceleration target is detected. Therefore, the deceleration of the own vehicle can be appropriately assisted.

According to an aspect of the present invention, the electronic control unit may be configured to change the deceleration intensity by changing at least one of (i) the deceleration rate of the own vehicle, (ii) an increasing rate of the deceleration rate of the own vehicle, and (iii) a deceleration start timing of starting to decelerate the own vehicle.

With the vehicle driving assistance apparatus according to this aspect of the present invention, the deceleration intensity of the own vehicle can be changed by using the deceleration rate of the own vehicle, the increasing rate of the deceleration rate of the own vehicle, or the deceleration starting timing of starting to decelerate the own vehicle.

According to another aspect of the present invention, the electronic control unit may be configured to set the deceleration intensity of the second deceleration characteristic by the deceleration control such that the deceleration intensity of the second deceleration characteristic when the accelerator pedal is operated after the deceleration target is detected and then, the operation of the accelerator pedal is released, is greater than the deceleration intensity of the second deceleration characteristic when the accelerator pedal has been operated when the deceleration target is detected and then, the operation of the accelerator pedal is released. In this aspect, the electronic control unit may be configured to set the deceleration intensity of the third deceleration characteristic by the deceleration control such that the deceleration intensity of the third deceleration characteristic when the brake pedal is operated after the deceleration target is detected and then, the operation of the brake pedal is released, is smaller than the deceleration intensity of the third deceleration characteristic when the brake pedal has been operated when the deceleration target is detected and then, the operation of the brake pedal is released.

With the vehicle driving assistance apparatus according to this aspect of the present invention, the own vehicle can be decelerated at the appropriate deceleration intensity when the accelerator pedal is operated after the deceleration target is detected and then, the operation of the accelerator pedal is released as well as when the accelerator pedal has been operated when the deceleration target is detected and then, the operation of the accelerator pedal is released. Further, the own vehicle can be decelerated at the appropriate deceleration intensity when the brake pedal is operated after the deceleration target is detected and then, the operation of the brake pedal is released as well as when the brake pedal has been operated when the deceleration target is detected and then, the operation of the brake pedal is released.

According to further another aspect of the present invention, the electronic control unit may be configured to set the deceleration intensities of the second and third deceleration characteristics, depending on a type of the deceleration target.

With the vehicle driving assistance apparatus according to this aspect of the present invention, the own vehicle can be decelerated at the appropriate deceleration intensity, depending on the type of the deceleration target.

According to further another aspect of the present invention, the electronic control unit may be configured to set the predetermined accelerator release elapsing time and the predetermined brake release elapsing time, or the predetermined accelerator release deceleration intensity and the predetermined brake release deceleration intensity.

With the vehicle driving assistance apparatus according to this aspect of the present invention, the own vehicle can be decelerated at the appropriate deceleration intensity, depending on the type of the deceleration target.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
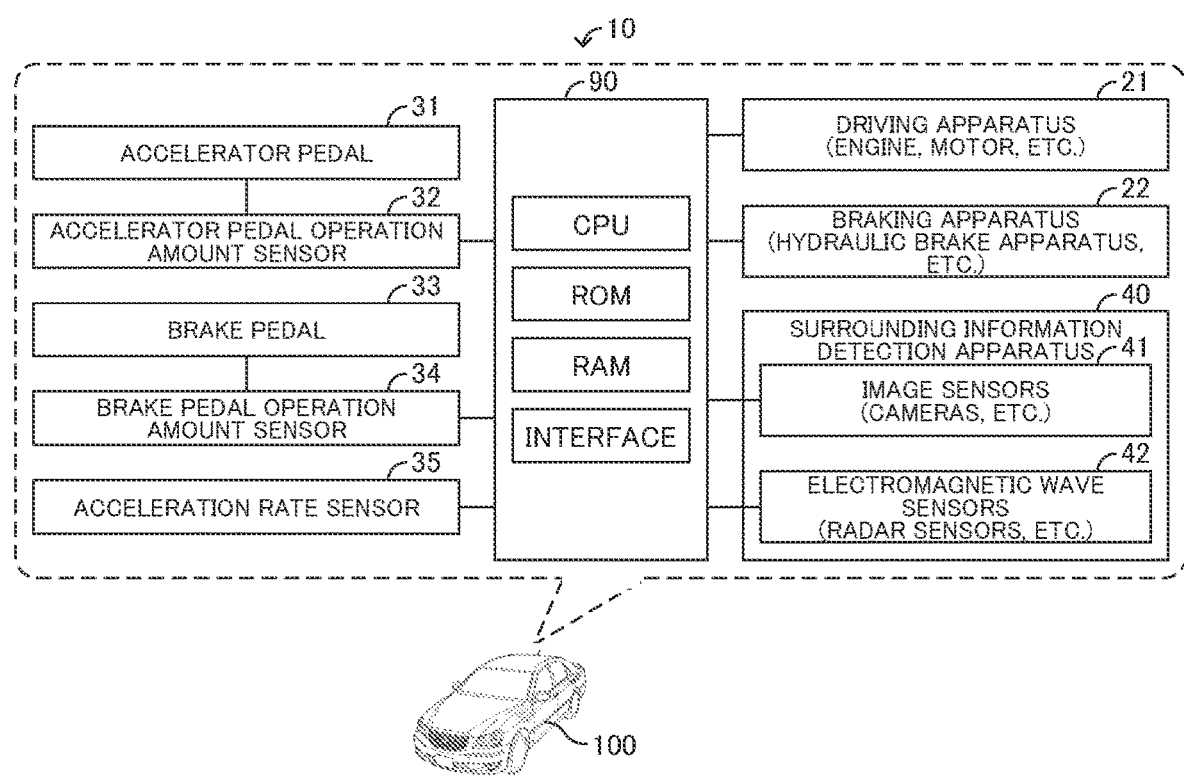
FIG. 1 is a view which shows a vehicle driving assistance apparatus according to an embodiment of the present invention.

Below, a vehicle driving assistance apparatus according to an embodiment of the present invention will be described with reference to the drawings. As shown in FIG. 1, the vehicle driving assistance apparatus 10 according to the embodiment of the present invention is mounted on an own vehicle 100. The vehicle driving assistance apparatus 10 may be mounted on a vehicle which is configured to be remotely operated.

The vehicle driving assistance apparatus 10 includes an ECU (an electronic control device) 90 as a control device. The ECU 90 includes a microcomputer as a main component. The microcomputer includes a storage medium such as a CPU, ROM, RAM and a non-volatile memory, an interface, and the like. The CPU is configured or programmed to realize various functions by executing instructions, programs, or routines stored in the storage medium. In particular, in the present example, the vehicle driving assistance apparatus 10 stores programs of realizing various controls executed by the vehicle driving assistance apparatus 10 in the storage medium.

It should be noted that the vehicle driving assistance apparatus 10 may be configured to be able to update the programs stored in the storage medium by wireless communication (for example, internet communication) with external apparatuses.

A driving apparatus 21 and a braking apparatus 22 are mounted on the own vehicle 100.

The driving apparatus 21 is an apparatus which generates a driving force applied to the own vehicle 100 for moving the own vehicle 100. The driving apparatus 21 includes, for example, an internal combustion engine and/or at least one electric motor. The driving apparatus 21 is electrically connected to the ECU 90. The vehicle driving assistance apparatus 10 controls the driving force applied to the own vehicle 100 by controlling an operation of the driving apparatus 21.

The braking apparatus 22 is an apparatus which generates a braking force applied to the own vehicle 100 for braking the own vehicle 100. The braking apparatus 22 includes, for example, a hydraulic braking apparatus. The braking apparatus 22 is electrically connected to the ECU 90. The vehicle driving assistance apparatus 10 controls the braking force applied to the own vehicle 100 by controlling an operation of the braking apparatus 22.

Further, the own vehicle 100 is equipped with an accelerator pedal 31, an accelerator pedal operation amount sensor 32, a brake pedal 33, a brake pedal operation amount sensor 34, an acceleration rate sensor 35, and a surrounding information detection apparatus 40.

The accelerator pedal operation amount sensor 32 is a sensor which detects an operation amount of the accelerator pedal 31 by the driver. The accelerator pedal operation amount sensor 32 is electrically connected to the ECU 90. The vehicle driving assistance apparatus 10 acquires the operation amount of the accelerator pedal 31 as an accelerator pedal operation amount AP by the accelerator pedal operation amount sensor 32.

The brake pedal operation amount sensor 34 is a sensor which detects an operation amount of the brake pedal 33 by the driver. The brake pedal operation amount sensor 34 is electrically connected to the ECU 90. The vehicle driving assistance apparatus 10 acquires the operation amount of the brake pedal 33 as a brake pedal operation amount BP by the brake pedal operation amount sensor 34.

The acceleration rate sensor 35 is a sensor which detects a longitudinal acceleration rate of the own vehicle 100. The acceleration rate sensor 35 is electrically connected to the ECU 90. The vehicle driving assistance apparatus 10 acquires the acceleration rate of the own vehicle 100 as an acceleration rate G by the acceleration rate sensor 35.

The surrounding information detection apparatus 40 is an apparatus which detects information on situations around the own vehicle 100. In the present embodiment, the surrounding information detection apparatus 40 includes image sensors 41 and electromagnetic wave sensors 42.

The image sensor 41 is a sensor which captures and acquires images of views around the own vehicle 100. The image sensor 41 is, for example, a camera. The image sensors 41 are electrically connected to the ECU 90. The vehicle driving assistance apparatus 10 acquires surrounding images, i.e., the images of the views around the own vehicle 100 as surrounding detection information IF by the image sensors 41.

The electromagnetic wave sensor 42 is a sensor which detects objects existing around the own vehicle 100. The electromagnetic wave sensor 42 is, for example, a radio wave sensor such as a radar sensor such as a millimeter wave radar, a sound wave sensor such as an ultrasonic sensor such as a clearance sonar, or an optical sensor such as a laser radar such as a LiDAR. The electromagnetic wave sensors 42 are electrically connected to the ECU 90. The vehicle driving assistance apparatus 10 acquires object information, i.e., information on objects existing around the own vehicle 100 as the surrounding detection information IF by the electromagnetic wave sensor 42.

<Operations of Vehicle Driving Assistance Apparatus>

Next, operations of the vehicle driving assistance apparatus 10 will be described. The vehicle driving assistance apparatus 10 executes a deceleration control which is an automatic driving control to decelerate the own vehicle 100 when (i) there is a deceleration target TGT, and (ii) a deceleration assistance start condition is satisfied. The deceleration target TGT is an object leading to a necessity of decelerating the own vehicle 100 ahead of the own vehicle 100. The deceleration assistance start condition is a condition for starting a deceleration assistance to the own vehicle 100.

In other words, the vehicle driving assistance apparatus 10 execute the deceleration control to (i) decelerate the own vehicle 100 with a first deceleration characteristic when the deceleration target TGT leading to the necessity of decelerating the own vehicle 100 is detected while the operation of the accelerator pedal 31 or the operation of the brake pedal 33 is released, (ii) decelerate the own vehicle 100 with a second characteristic when the operation of the accelerator pedal 31 is released while the deceleration target TGT is detected, and (iii) decelerate the own vehicle 100 with a third characteristic when the operation of the brake pedal 33 is released while the deceleration target TGT is detected. The first deceleration characteristic is a characteristic that a deceleration intensity of decelerating the own vehicle 100 is a first intensity. The second characteristic is a characteristic that the deceleration intensity of decelerating the own vehicle 100 is a second intensity equal to or greater than the first intensity. The third characteristic is a characteristic that the deceleration intensity of decelerating the own vehicle 100 is a third intensity equal to or smaller than the first intensity.

Figure 2:
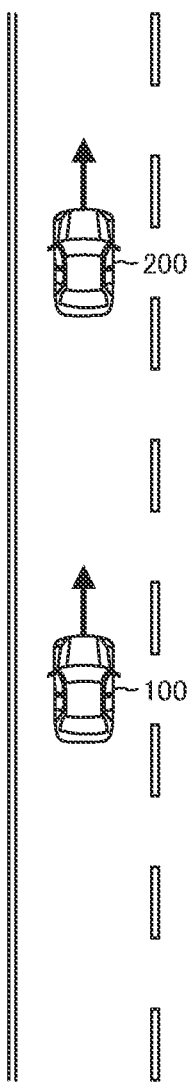
FIG. 2 is a view which shows a scene that there is a preceding vehicle ahead of an own vehicle.

The deceleration target TGT is a preceding vehicle 200 (refer to FIG. 2) ahead of the own vehicle 100, a traffic light, a stop road sign, a stop road line, a curved road, or a road having a road surface on which vehicles are regulated to move at a low vehicle moving speed.

It should be noted that the deceleration control according to the present invention can be applied to a scene that the necessity of decelerating the vehicle arises while a following moving control is executed, or a scene that the necessity of decelerating the vehicle arises while a collision damage reduction control is executed. The following moving control is the automatic driving control to automatically move the vehicle, following the preceding vehicle, and the collision damage reduction control is the automatic driving control to automatically decelerate or stop the vehicle in order to avoid a collision of the vehicle with an object.

Figure 3:
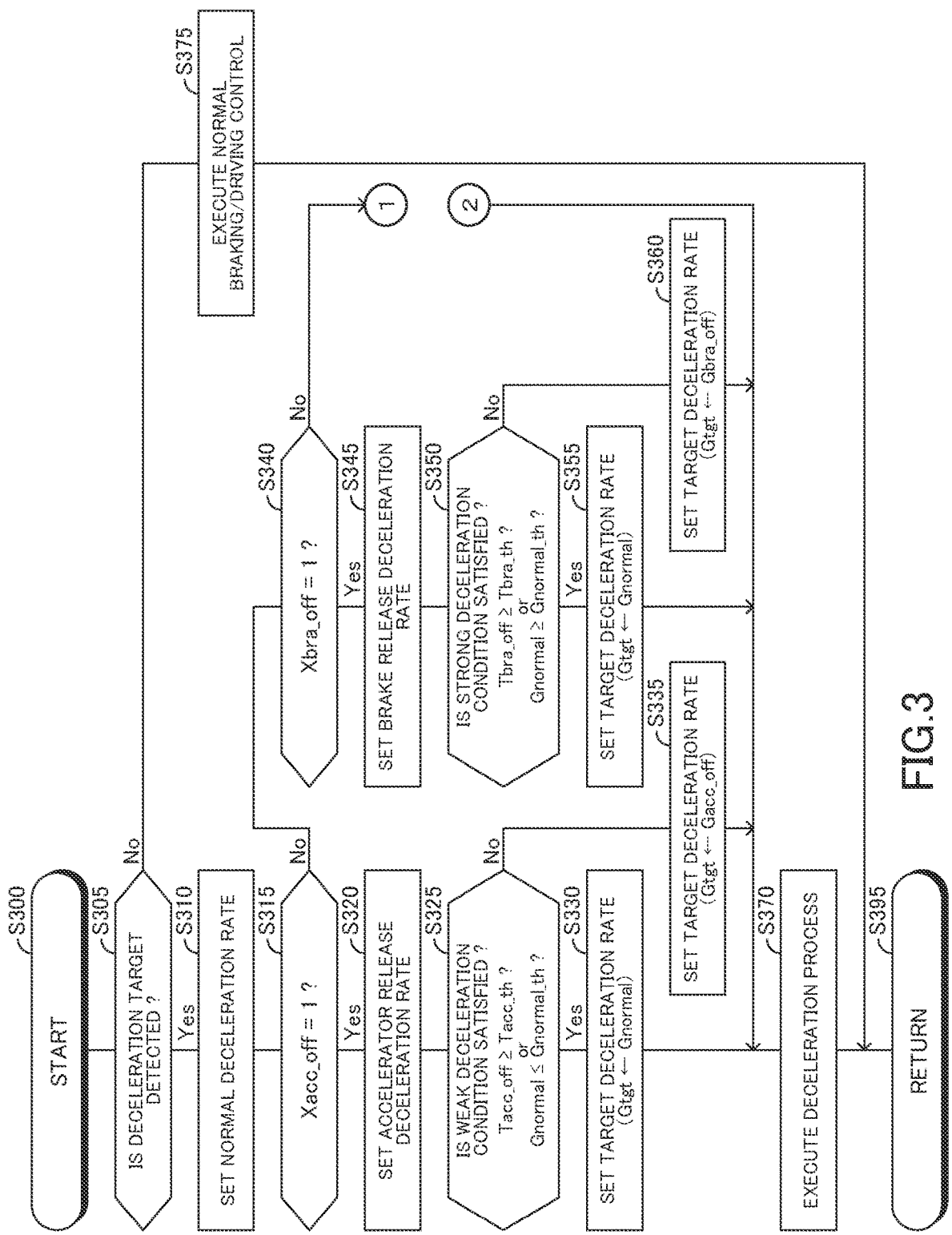
FIG. 3 is a view which shows a flowchart of a routine executed by the vehicle driving assistance apparatus according to the embodiment of the present invention.

The vehicle driving assistance apparatus 10 executes the deceleration control by executing a routine shown in FIG. 3 at predetermined calculation intervals. Therefore, at a predetermined timing, the vehicle driving assistance apparatus 10 starts a process from a step S300 of the routine shown in FIG. 3 and proceeds with the process to a step S305 to determine whether the deceleration target TGT is detected. The vehicle driving assistance apparatus 10 detects the deceleration target TGT, based on the surrounding detection information IF.

When the vehicle driving assistance apparatus 10 determines "Yes" at the step S305, the vehicle driving assistance apparatus 10 proceeds with the process to a step S310 to set a normal deceleration rate Gnormal. The normal deceleration rate Gnormal is the appropriate deceleration rate as the deceleration rate of the own vehicle 100 when an accelerator operation (i.e., the operation of the accelerator pedal 31) and a braking operation (i.e., the operation of the brake pedal 33) are released while there is the deceleration target TGT. In addition, the normal deceleration rate Gnormal corresponds to the first deceleration characteristic that the deceleration intensity of decelerating the own vehicle 100 is the first intensity.

Next, the vehicle driving assistance apparatus 10 proceeds with the process to a step S315 to determine whether an accelerator release flag Xacc_off is "1". The value of the accelerator release flag Xacc_off is set to "1" when the accelerator operation is released while the deceleration target TGT is detected. On the other hand, the value of the accelerator release flag Xacc_off is set to "0" when the accelerator pedal 31 is operated while the value of the accelerator release flag Xacc_off is "1", or when the brake pedal 33 is operated while the value of the accelerator release flag Xacc_off is "1", or when a deceleration assistance termination condition (i.e., a condition for terminating the deceleration control) is satisfied while the value of the accelerator release flag Xacc_off is "1". It should be noted that the deceleration assistance termination condition is satisfied, for example, when the deceleration target TGT is no longer detected.

When the vehicle driving assistance apparatus 10 determines "Yes" at the step S315, the vehicle driving assistance apparatus 10 proceeds with the process to the step S320 to set an accelerator release deceleration rate Gacc_off. The accelerator release deceleration rate Gacc_off is the appropriate deceleration rate of the own vehicle 100 when the accelerator operation is released while there is the deceleration target TGT. In the present embodiment, the accelerator release deceleration rate Gacc_off is set to a value equal to or greater than the normal deceleration rate Gnormal. However, the accelerator release deceleration rate Gacc_off may be set to a value greater than the normal deceleration rate Gnormal. It should be noted that the accelerator release deceleration rate Gacc_off corresponds to the second deceleration characteristics that the deceleration intensity is the second intensity equal to or greater than the first intensity.

Next, the vehicle driving assistance apparatus 10 proceeds with the process to a step S325 to determine whether a weak deceleration condition Cweak is satisfied. The weak deceleration condition Cweak is a condition that a deceleration of the own vehicle 100 at the relatively small deceleration rate is currently required. In the present embodiment, the weak deceleration condition Cweak is a condition that an accelerator release elapsing time Tacc_off is equal to or greater than a predetermined time (or a predetermined accelerator release elapsing time Tacc_off_th), or a condition that the normal deceleration rate Gnormal set at the step S310 is equal to or smaller than a predetermined value (or a predetermined accelerator release deceleration rate Gacc_off_th).

The accelerator release elapsing time Tacc_off is a time elapsing since the accelerator operation is released while there is the deceleration target TGT. Further, the weak deceleration condition Cweak may be a condition that the accelerator release elapsing time Tacc_off is equal to or greater than the predetermined accelerator release elapsing time Tacc_off_th, or may be a condition that the normal deceleration rate Gnormal set at the step S310 is equal to or smaller than the predetermined accelerator release deceleration rate Gacc_off_th.

When the vehicle driving assistance apparatus 10 determines "No" at the step S325, the vehicle driving assistance apparatus 10 proceeds with the process to a step S335 to set the accelerator release deceleration rate Gacc_off set at the step S320 as a target deceleration rate Gtgt. In particular, the vehicle driving assistance apparatus 10 sets, as the target deceleration rate Gtgt, the accelerator release deceleration rate Gacc_off having an increasing speed (or a jerk value) limited to a certain value or less. Next, the vehicle driving assistance apparatus 10 proceeds with the process to a step S370 to decelerate the own vehicle 100 such that the target deceleration rate Gtgt set at the step S335 is realized. Then, the vehicle driving assistance apparatus 10 proceeds with the process to a step S395 to terminate executing this routine once.

That is, when the operation of the accelerator pedal 31 is released while the deceleration target TGT is detected, the vehicle driving assistance apparatus 10 decelerates the own vehicle 100 with the second deceleration characteristic (or the accelerator release deceleration rate Gacc_off) that the deceleration intensity is the second intensity equal to or greater than the first intensity.

It should be noted that the vehicle driving assistance apparatus 10 decelerates the own vehicle 100 by stopping applying the driving force from the driving apparatus 21 to the own vehicle 100, or by stopping applying the driving force from the driving apparatus 21 to the own vehicle 100 and applying the braking force from the braking apparatus 22 to the own vehicle 100.

On the other hand, when the vehicle driving assistance apparatus 10 determines "Yes" at the step S325, the vehicle driving assistance apparatus 10 proceeds with the process to a step S330 to set the normal deceleration rate Gnormal set at the step S310 as the target deceleration rate Gtgt. In particular, in the present embodiment, the vehicle driving assistance apparatus 10 sets, as the target deceleration rate Gtgt, a limited deceleration rate Glimit, i.e., the normal deceleration rate Gnormal having the increasing rate (or the jerk value) limited to a certain value or less. Next, the vehicle driving assistance apparatus 10 proceeds with the process to the step S370 to decelerate the own vehicle 100 such that the target deceleration rate Gtgt set at the step S330 is realized. Then, the vehicle driving assistance apparatus 10 proceeds with the process to the step S395 to terminate executing this routine once.

That is, the vehicle driving assistance apparatus 10 (i) terminates decelerating the own vehicle 100 with the second deceleration characteristic by the deceleration control, i.e., terminates decelerating the own vehicle 100 at the accelerator release deceleration rate Gacc_off by the deceleration control, and (ii) starts to decelerate the own vehicle 100 with the first deceleration characteristic by the deceleration control when the predetermined accelerator release elapsing time Tacc_off_th elapses since the operation of the accelerator pedal 31 is released while the deceleration target TGT is detected, or when the deceleration intensity of the first deceleration characteristic is equal to or smaller than the predetermined accelerator release deceleration intensity (i.e., the normal deceleration rate Gnormal is equal to or smaller than the predetermined accelerator release deceleration rate Gacc_off_th).

Further, when the vehicle driving assistance apparatus 10 determines "No" at the step S315, the vehicle driving assistance apparatus 10 proceeds with the process to a step S340 to determine whether a brake release flag Xbra_off is "1". The value of the brake release flag Xbra_off is set to "1" when the brake operation is released while the deceleration target TGT is detected. On the other hand, the value of the brake release flag Xbra_off is set to "0" when the brake pedal 33 is operated while the value of the brake release flag Xbra_off is "1", or when the accelerator pedal 31 is operated while the value of the brake release flag Xbra_off is "1", or when the deceleration assistance termination condition, i.e., the condition for terminating the deceleration control is satisfied while the value of the brake release flag Xbra_off is "1".

When the vehicle driving assistance apparatus 10 determines "Yes" at the step S340, the vehicle driving assistance apparatus 10 proceeds with the process to a step S345 to set a brake release deceleration rate Gbra_off as the target deceleration rate Gtgt. The brake release deceleration rate Gbra_off is the appropriate deceleration of the own vehicle 100 when the brake operation is released while there is the deceleration target TGT. In the present embodiment, the brake release deceleration rate Gbra_off is set to a value equal to or smaller than the normal deceleration rate Gnormal. However, the brake release deceleration rate Gbra_off may be set to a value smaller than the normal deceleration rate Gnormal. It should be noted that the brake release deceleration rate Gbra_off corresponds to the third deceleration characteristics that the deceleration intensity is the third intensity equal to or smaller than the first intensity.

Next, the vehicle driving assistance apparatus 10 proceeds with the process to a step S350 to determine whether a strong deceleration condition Cstrong is satisfied. The strong deceleration condition Cstrong is a condition that the deceleration of the own vehicle 100 at the relatively great deceleration rate is currently required. In the present embodiment, the strong deceleration condition Cstrong is a condition that a brake release elapsing time Tbra_off is equal to or greater than a predetermined time (or a predetermined brake release elapsing time Tbra_off_th), or a condition that the normal deceleration rate Gnormal set at the step S310 is equal to or smaller than a predetermined value (or a predetermined brake release deceleration rate Gbra_off_th).

The brake release elapsing time Tbra_off is a time elapsing since the brake operation is released while there is the deceleration target TGT. Further, the predetermined brake release elapsing time Tbra_off_th may be set to the same time as the predetermined accelerator release elapsing time Tacc_off_th, or may be set to a time different from the predetermined accelerator release elapsing time Tacc_off_th.

Further, the strong deceleration condition Cstrong may be a condition that the brake release elapsing time Tbra_off is equal to or greater than the predetermined brake release elapsing time Tbra_off_th, or may be a condition that the normal deceleration rate Gnormal set at the step S310 is equal to or smaller than the predetermined brake release deceleration rate Gbra_off_th.

When the vehicle driving assistance apparatus 10 determines "No" at the step S350, the vehicle driving assistance apparatus 10 proceeds with the process to a step S360 to set the brake release deceleration rate Gbra_off set at the step S345 as the target deceleration rate Gtgt. In particular, the vehicle driving assistance apparatus 10 sets, as the target deceleration rate Gtgt, the brake release deceleration rate Gbra_off having the increasing speed (or the jerk value) limited to a certain value or less. Next, the vehicle driving assistance apparatus 10 proceeds with the process to the step S370 to decelerate the own vehicle 100 such that the target deceleration rate Gtgt set at the step S360 is realized. Then, the vehicle driving assistance apparatus 10 proceeds with the process to the step S395 to terminate executing this routine once.

That is, the vehicle driving assistance apparatus 10 decelerates the own vehicle 100 with the third deceleration characteristic (or the brake release deceleration rate Gra_off) that the deceleration intensity is the third intensity equal to or smaller than the first intensity when the operation of the brake pedal 33 is released while the deceleration target TGT is detected.

On the other hand, when the vehicle driving assistance apparatus 10 determines "Yes" at the step S350, the vehicle driving assistance apparatus 10 proceeds with the process to a step S355 to set the normal deceleration rate Gnormal set at the step S310 as the target deceleration rate Gtgt. In particular, in the present embodiment, the vehicle driving assistance apparatus 10 sets the limited deceleration rate Glimit as the target deceleration rate Gtgt. Next, the vehicle driving assistance apparatus 10 proceeds with the process to the step S370 to decelerate the own vehicle 100 such that the target deceleration rate Gtgt set at the step S350 is realized. Then, the vehicle driving assistance apparatus 10 proceeds with the process to the step S395 to terminate executing this routine once.

That is, the vehicle driving assistance apparatus 10 (i) terminates decelerating the own vehicle 100 with the third deceleration characteristic by the deceleration control, i.e., terminates decelerating the own vehicle 100 at the brake release deceleration rate Gbra_off, and (ii) starts to decelerate the own vehicle 100 with the first deceleration characteristic by the deceleration control, i.e., starts to decelerate the own vehicle 100 at the normal deceleration rate Gnormal when the predetermined brake release elapsing time Tbra_off_th elapses since the operation of the brake pedal 33 is released while the deceleration target TGT is detected, or when the deceleration intensity of the first deceleration characteristic is equal to or greater than the predetermined brake release deceleration intensity (i.e., the normal deceleration rate Gnormal is equal to or greater than the predetermined brake release deceleration rate Gbra_off_th).

Figure 4:
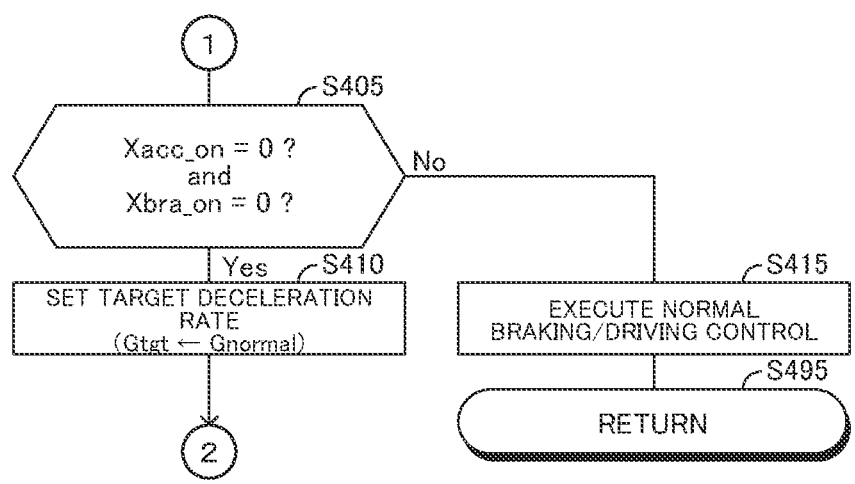
FIG. 4 is a view which shows a flowchart of a routine executed by the vehicle driving assistance apparatus according to the embodiment of the present invention.

Further, when the vehicle driving assistance apparatus 10 determines "No" at the step S340, the vehicle driving assistance apparatus 10 proceeds with the process to a step S405 of a routine shown in FIG. 4 to determine whether a value of an accelerator operation flag Xacc_on is "0", and a value of a brake operation flag Xbra_on is "0". The value of the accelerator control flag Xacc_on is set to "1" when the accelerator pedal 31 is operated, and is set to "0" when the accelerator operation is released. The value of the brake control flag Xbra_on is set to "1" when the brake pedal 33 is operated, and is set to "0" when the brake operation is released.

When the vehicle driving assistance apparatus 10 determines "Yes" at the step S405, the vehicle driving assistance apparatus 10 proceeds with the process to a step S410 to set the normal deceleration rate Gnormal set at the step S310 as the target deceleration rate Gtgt. Then, the vehicle driving assistance apparatus 10 proceeds with the process to the step S370 of the routine shown in FIG. 3 to decelerate the own vehicle 100 such that the target deceleration rate Gtgt set at the step S410 is realized. Then, the vehicle driving assistance apparatus 10 proceeds with the process to the step S395 to terminate executing this routine once.

On the other hand, when the vehicle driving assistance apparatus 10 determines "No" at the step S405, the vehicle driving assistance apparatus 10 proceeds with the process to a step S415 to execute a normal braking/driving control. The normal braking/driving control is a control to apply the driving force depending on the accelerator pedal operation amount AP to the own vehicle 100 when the accelerator pedal 31 is operated, and apply the braking force depending on the brake pedal operation amount BP to the own vehicle 100 when the brake pedal 33 is operated. Next, the vehicle driving assistance apparatus 10 proceeds with the process to a step S495 to terminate executing this routine once.

Further, when the vehicle driving assistance apparatus 10 determines "No" at the step S305 of the routine shown in FIG. 3, the vehicle driving assistance apparatus 10 proceeds with the process to a step S375 to execute the normal braking/driving control is executed. Then, the vehicle driving assistance apparatus 10 proceeds with the process to the step S395 to terminate executing this routine once.

Figure 5:
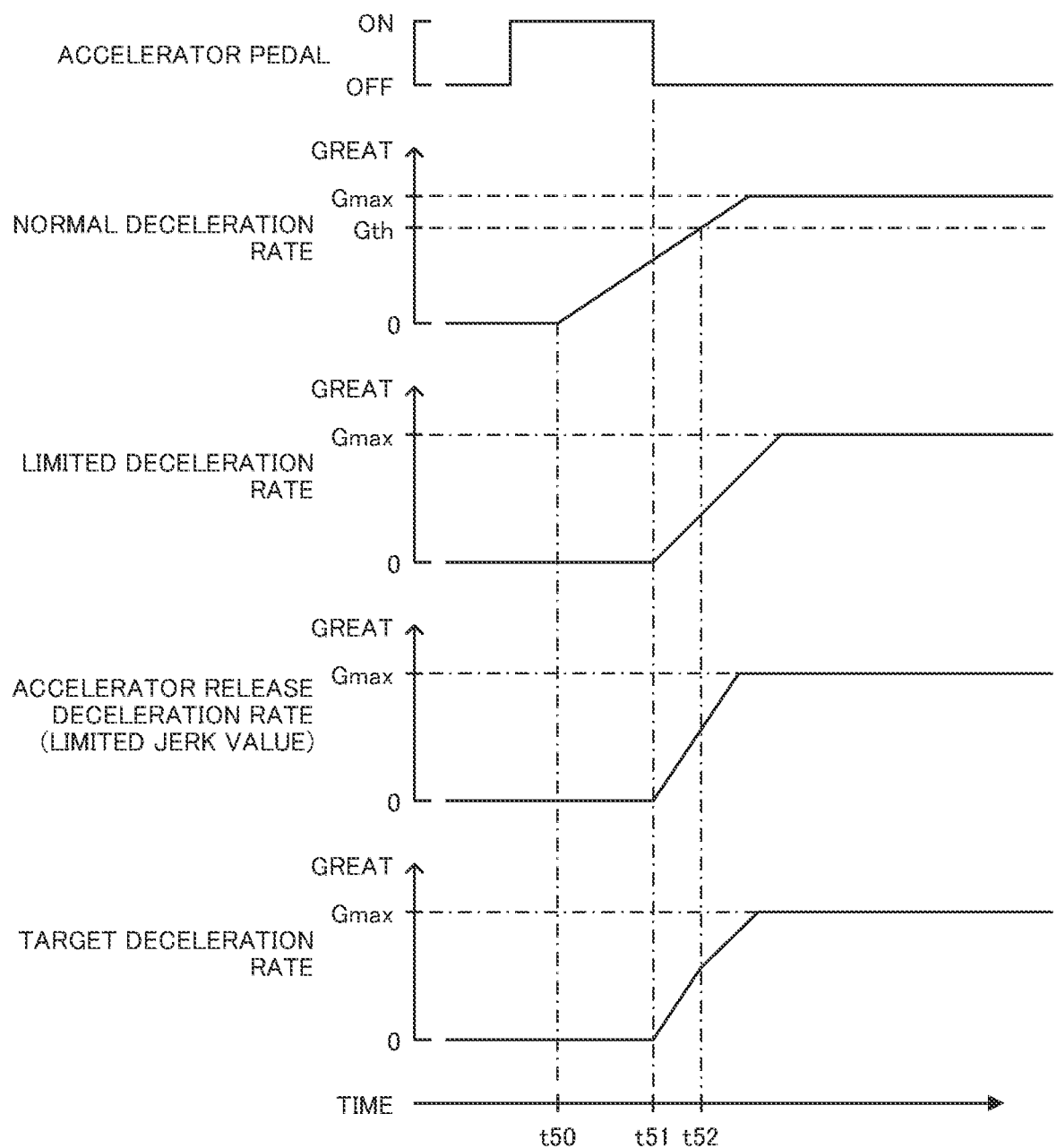
FIG. 5 is a view used to describe operations of the vehicle driving assistance apparatus in a situation where an operation of an accelerator pedal is released while a deceleration target is detected.
Figure 6:
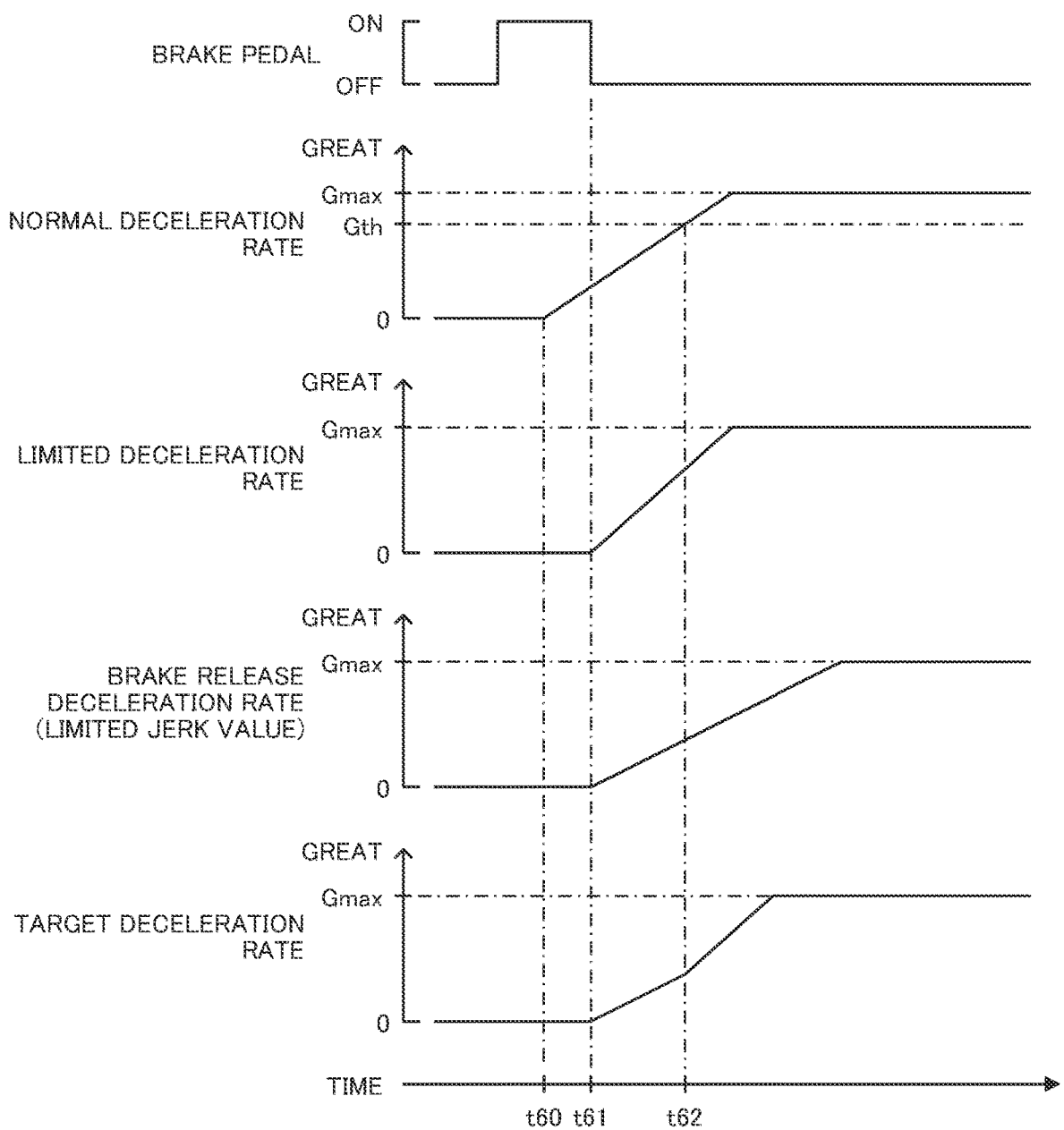
FIG. 6 is a view used to describe the operations of the vehicle driving assistance apparatus in a situation where an operation of a brake pedal is released while the deceleration target is detected.

The operations of the vehicle driving assistance apparatus 10 have been described. With the vehicle driving assistance apparatus 10, for example, as shown in FIG. 5, in a scene that (i) the accelerator pedal 31 is operated at a time t50 at which the deceleration target TGT is detected, and (ii) the operation of the accelerator pedal 31 is released at a time t51, the target deceleration rate Gtgt is increased in accordance with the accelerator release deceleration rate Gacc_off having the jerk value limited to a certain value or less until a time t52 at which the normal deceleration rate Gnormal reaches the predetermined accelerator release deceleration rate Gacc_off_th and after the time t52, the target deceleration rate Gtgt is increased in accordance with the limited deceleration rate Glimit. Further, for example, as shown in FIG. 6, in a scene that (i) the brake pedal 33 is operated at a time t60 at which the deceleration target TGT is detected, and (ii) the operation of the brake pedal 33 is released at a time t61, the target deceleration rate Gtgt is increased in accordance with the brake release deceleration rate Gbra_off having the jerk value limited to a certain value or less until a time t62 at which the normal deceleration rate Gnormal reaches the predetermined brake release deceleration rate Gbra_off_th and after the time t62, the target deceleration rate Gtgt is increased in accordance with the limited deceleration rate Glimit. It should be noted that in FIG. 5 and FIG. 6, a reference numeral Gmax denotes an upper limit value of the target deceleration rate Gtgt.

With the vehicle driving assistance apparatus 10, the deceleration rate of the own vehicle 100 is decreased in a scene that the deceleration of the own vehicle 100 may become excessive when a certain period of time elapses since the own vehicle 100 starts to be decelerated at the relatively great deceleration in response to the accelerator operation being released while the deceleration target TGT is detected, or in a scene that the deceleration of the own vehicle 100 may become excessive due to the target deceleration rate Gtgt becoming relatively small while the deceleration target TGT is detected. Therefore, the deceleration of the own vehicle 100 can be appropriately assisted. Further, the deceleration rate of the own vehicle 100 is increased in a scene that the deceleration of the own vehicle 100 may become insufficient when a certain period of time elapses since the own vehicle 100 starts to be decelerated at the relatively small deceleration in response to the brake operation being released while the deceleration target TGT is detected, or in a scene that the deceleration of the own vehicle 100 may become insufficient due to the target deceleration rate Gtgt becoming relatively great while the deceleration target TGT is detected. Therefore, the deceleration of the own vehicle 100 can be appropriately assisted.

Note that the present invention is not limited to the above-described embodiments, and various modifications can be adopted within the scope of the present invention.

For example, the vehicle driving assistance apparatus 10 may be configured to execute the deceleration control to change the deceleration characteristic of the own vehicle 100 by setting a constant deceleration rate Gconstant as the target deceleration Gtgt and changing a target deceleration increasing speed or a target jerk value JKtgt, i.e., the increasing speed for increasing the deceleration rate of the own vehicle 100 to the target deceleration rate Gtgt in place of or in addition to changing the deceleration characteristic of the own vehicle 100 by changing the target deceleration rate Gtgt. In this case, when it is determined "Yes" at the step S325 or the step S350 of the routine shown in FIG. 3, a normal jerk value JKnormal is set as the target jerk value JKtgt. In addition, when it is determined "No" at the step S325, a value greater than the normal jerk value JKnormal is set as the target jerk value JKtgt. In addition, when it is determined "No" at the step S350, a value smaller than the normal jerk value JKnormal is set as the target jerk value JKtgt. Then, at the step S370, the own vehicle 100 is decelerated such that the deceleration rate of the own vehicle 100 is increased with the target jerk value JKtgt toward the target deceleration rate Gtgt.

Alternatively, the vehicle driving assistance apparatus 10 may be configured to execute the deceleration control to change the deceleration characteristic of the own vehicle 100 by setting the constant deceleration rate Gconstant as the target deceleration Gtgt and changing a target deceleration start timing ttgt, i.e., a timing at which the deceleration of the own vehicle 100 is started in place of or in addition to changing the deceleration characteristic of the own vehicle 100 by changing the target deceleration rate Gtgt. In this case, when it is determined "Yes" at the step S325 or the step S350 of the routine shown in FIG. 3, a normal timing tnormal is set as the target deceleration start timing ttgt. In addition, when it is determined "No" at the step S325, a timing earlier than the normal timing tnormal is set as the target deceleration start timing ttgt. In addition, when it is determined "No" at the step S350, a timing later than the normal timing tnormal is set as the target deceleration start timing ttgt. Then, at the step S370, the own vehicle 100 starts to be decelerated at the target deceleration start timing ttgt.

Further, the vehicle driving assistance apparatus 10 may be configured such that the deceleration characteristic of the own vehicle 100 by the deceleration control is likely to be maintained at the strong deceleration characteristic by increasing the predetermined accelerator release elapsing time Tacc_off_th, or decreasing the predetermined accelerator release deceleration rate Gacc_off_th when the accelerator pedal 31 is operated after the deceleration target TGT is detected and then, the operation of the accelerator pedal 31 is released, compared with when the accelerator pedal 31 has been operated at a time of detecting the deceleration target TGT and then, the operation of the accelerator pedal 31 is released.

Further, the vehicle driving assistance apparatus 10 may be configured such that the deceleration characteristic of the own vehicle 100 by the deceleration control is likely to be maintained at the weak deceleration characteristic by increasing the predetermined brake release elapsing time Tbra_off_th, or increasing the predetermined brake release deceleration rate Gbra_off_th when the brake pedal 33 is operated after the deceleration target TGT is detected and then, the operation of the brake pedal 33 is released, compared with when the brake pedal 33 has been operated at the time of detecting the deceleration target TGT and then, the operation of the brake pedal 33 is released.

Further, the vehicle driving assistance apparatus 10 may be configured to change the deceleration characteristic of the own vehicle 100 by the deceleration control, depending on a type of the deceleration target TGT. For example, the vehicle driving assistance apparatus 10 may be configured such that the deceleration characteristic of the own vehicle 100 by the deceleration control is likely to be the strong deceleration characteristic when the deceleration target TGT is such as a preceding vehicle which can lead a probability of colliding with the own vehicle 100.

When the deceleration target TGT is the preceding vehicle, the need for decelerating the own vehicle 100 varies, depending on a relative speed or an inter-vehicle distance between the own vehicle 100 and the preceding vehicle. When the deceleration target TGT is a traffic light, the traffic light lights a red signal or a green signal, and the need for decelerating the own vehicle 100 also varies. Therefore, the vehicle driving assistance apparatus 10 may be configured such that the deceleration characteristic of the own vehicle 100 by the deceleration control is likely to be the strong deceleration characteristic when the deceleration target TGT is such as the preceding vehicle or the traffic light which changes the need for decelerating the own vehicle 100.

Further, a moving speed of the own vehicle 100 varies, depending on the driver when the own vehicle 100 moves on a curved road or a road having a road surface on which the own vehicle 100 should move at the low moving speed, and the need for decelerating the own vehicle 100 varies. Accordingly, the vehicle driving assistance apparatus 10 may be configured such that the deceleration characteristic of the own vehicle 100 by the deceleration control is likely to be the weak deceleration characteristic when the deceleration target TGT changes the need for decelerating the own vehicle 100, depending on the moving speed of the own vehicle 100.

Furthermore, the vehicle driving assistance apparatus 10 may be configured such that the deceleration characteristic of the own vehicle 100 by the deceleration control is likely to be the weak deceleration characteristic when the deceleration target TGT is a stop road sign or a stop line which requires a certain speed as a target moving speed of the own vehicle 100.

Further, the vehicle driving assistance apparatus 10 may be configured such that the deceleration characteristic of the own vehicle 100 by the deceleration control after the accelerator operation is released, has the deceleration characteristic which becomes stronger in the order of the traffic light, the stop road sign or the stop line, the preceding vehicle, and the curve road as the deceleration target TGT.

Furthermore, the vehicle driving assistance apparatus 10 may be configured such that the deceleration characteristic of the own vehicle 100 by the deceleration control after the brake operation is released, has the deceleration characteristic which becomes weaker in the order of the curve road, the preceding vehicle, the stop road sign or the stop line, and the traffic light as the deceleration target TGT.

What is claimed is:

1. A vehicle driving assistance apparatus, comprising an electronic control unit configured to execute a deceleration control to:
   decelerate an own vehicle with a first deceleration characteristic that a deceleration intensity of decelerating the own vehicle is a first intensity when a deceleration target which leads to a necessity of decelerating the own vehicle, is detected while an operation of an accelerator pedal or a brake pedal is released;
   decelerate the own vehicle with a second deceleration characteristic that the deceleration intensity is a second intensity equal to or greater than the first intensity when the operation of the accelerator pedal is released while the deceleration target is detected; and
   decelerate the own vehicle with a third deceleration characteristic that the deceleration intensity is a third intensity equal to or smaller than the first intensity when the operation of the brake pedal is released while the deceleration target is detected,
   wherein the electronic control unit is configured to:
   terminate decelerating the own vehicle with the second deceleration characteristic by the deceleration control and start to decelerate the own vehicle with the first deceleration characteristic by the deceleration control when a predetermined accelerator release elapsing time elapses since the operation of the accelerator pedal is released while the deceleration target is detected, or when the deceleration intensity of the first deceleration characteristic is equal to or smaller than a predetermined accelerator release deceleration intensity; and
   terminate decelerating the own vehicle with the third deceleration characteristic by the deceleration control and start to decelerate the own vehicle with the first deceleration characteristic by the deceleration control when a predetermined brake release elapsing time elapses since the operation of the brake pedal is released while the deceleration target is detected, or when the deceleration intensity of the third deceleration characteristic is equal to or smaller than a predetermined brake release deceleration intensity.

2. The vehicle driving assistance apparatus as set forth in claim 1, wherein the electronic control unit is configured to change the deceleration intensity by changing at least one of (i) the deceleration rate of the own vehicle, (ii) an increasing rate of the deceleration rate of the own vehicle, and (iii) a deceleration start timing of starting to decelerate the own vehicle.

3. The vehicle driving assistance apparatus as set forth in claim 1,
   wherein the electronic control unit is configured to:
   set the deceleration intensity of the second deceleration characteristic by the deceleration control such that the deceleration intensity of the second deceleration characteristic when the accelerator pedal is operated after the deceleration target is detected and then, the operation of the accelerator pedal is released, is greater than the deceleration intensity of the second deceleration characteristic when the accelerator pedal has been operated when the deceleration target is detected and then, the operation of the accelerator pedal is released; and
   set the deceleration intensity of the third deceleration characteristic by the deceleration control such that the deceleration intensity of the third deceleration characteristic when the brake pedal is operated after the deceleration target is detected and then, the operation of the brake pedal is released, is smaller than the deceleration intensity of the third deceleration characteristic when the brake pedal has been operated when the deceleration target is detected and then, the operation of the brake pedal is released.

4. The vehicle driving assistance apparatus as set forth in claim 1, wherein the electronic control unit is configured to set the deceleration intensities of the second and third deceleration characteristics, depending on a type of the deceleration target.

5. The vehicle driving assistance apparatus as set forth in claim 1, wherein the electronic control unit is configured to set the predetermined accelerator release elapsing time and the predetermined brake release elapsing time, or the predetermined accelerator release deceleration intensity and the predetermined brake release deceleration intensity.

* * * * *